UNITED STATES PATENT OFFICE 2,472,130

PROCESS FOR THE PREPARATION OF A MIXTURE OF NUCLEOTIDES CONTAINING PREDOMINANTLY ADENOSINTRIPHOSPHATE

Albert Emerich Szent-Györgyi, London, England, assignor to Science Associates Inc., New York, N. Y., a corporation of New York No Drawing. Application August 31, 1946, Serial No. 694,416. In Hungary August 14, 1944

Section 1, Public Law 690, August 8, 1946
Patent expires August 14, 1964

6 Claims. (Cl. 260—210)

This invention relates to a process for the preparation of a mixture of nucleotides containing predominantly adenosintriphosphate, that is the triphosphate of the carbohydrate derivative of 6-aminopurine (adenine) which adenosintriphosphate is present as such in muscle tissue.

Adenosintriphosphate and related nucleotides are suitable for use in physiological research and in human therapy mainly for curing disturbances of the vascular system or of organs mainly consisting of smooth muscles, such as the uterus.

Such nucleotides were hitherto prepared from animal or vegetable tissues or cells by direct extraction, the extracts obtained being subjected to various methods of purification to isolate the nucleotides. Such methods have a very low yield since the nucleotides are present in the extracts in very dilute state and are accompanied by a large number of other substances from which said nucleotides can be separated only with considerable loss and by laborious methods.

The present invention is based on the discovery that the nucleotides hereinbefore referred to are not present in free condition in animal or vegetable tissues or cells but are linked to protein. It has furthermore been ascertained that only natural proteins are capable of such linkage and that such proteins, if denatured, are adapted to release the nucleotides, however only in the presence of an aqueous medium. Thus for instance, in the case of muscle tissue it has been found that adenosintriphosphate is linked with myosin and can be extracted from insolubilised myosin by water.

On the basis of the foregoing discoveries, the present invention provides a process for the preparation of a mixture of nucleotides containing predominantly adenosintriphosphate, which comprises comminuting animal or vegetable tissue or cells containing both protein and adenosintriphosphate, subjecting the comminuted tissue or cells to a treatment with a dehydrating agent adapted to insolubilise and precipitate protein, separating said dehydrating agent from the insoluble residue and treating said insoluble residue with water to produce an extract containing a substantial concentration of adenosintriphosphate.

The nucleotide can be isolated with ease from the aforesaid aqueous extract by various well known methods.

Suitable dehydrating agents for the purposes of the present invention are ethyl alcohol, methyl alcohol and acetone, ethyl alcohol being preferred.

The invention will be illustrated by the following example:

In order to produce adenosintriphosphate from horse muscle, the following procedure is adopted.

The animal is killed, the muscles are cut out and minced in a suitable mincing machine. The minced muscle tissue drops from the mincing machine into a vessel containing ethyl alcohol of 96% concentration, 4 litres of ethyl alcohol being used per kg. of muscle tissue. The minced muscle tissue is allowed to stand for about an hour in the alcohol, whereupon the alcohol together with water and other extracted substances is separated from the insoluble mass by filter-pressing or centrifuging. The separated alcohol is rejected.

The muscle residue is next suspended in a further quantity of ethyl alcohol of 96% concentration, 1 litre of alcohol being employed for every kg. of muscle tissure originally used.

The mixture of muscle tissue and alcohol is thereupon heated to boiling point in order to precipitate the proteins and render then insoluble.

After cooling, the alcohol and substances dissolved therein are again separated from the insoluble residue either by filtration or centrifuging.

The two treatments with alcohol remove from the muscle tissue not only water but also the bulk of the water-soluble substances present therein, as well as fats and lipins.

The sole water soluble substances retained in the muscle tissue are low molecular substances which are linked to the insolubilised proteins. Of these substances adenosintriphosphate is one which can be readily extracted from the muscle tissue residue by water.

Since many of the other low-molecular substances are more strongly adsorbed to the protein than adenosintriphosphate, the aqueous extract obtained will contain adenosintriphosphate of a relatively high degree of purity and in relatively high concentration.

The adenosintriphosphate can be purified by precipitating the aqueous extract with a solution of mercuric acetate acidified with acetic acid. The adenosintriphosphate can be liberated from the precipitate by treatment with sulphuretted hydrogen, the product dissolved in alcohol and re-precipitated as acid calcium salt by addition of calcium chloride to the alcoholic solution.

I claim:

1. In a process for extracting a natural animal tissue containing adenosintrophosphate and related substances, a first step of treating said tissue with a liquid dehydrating agent insolubilizing protein, and a second step of preparing an aqueous extract of said tissue after separating the liquid dehydrating agent from the tissue.

2. In a process for the recovery of a mixture of nucleotides containing predominantly adenosintriphosphate, from an animal tissue containing both protein and adenosintriphosphate, a first step of subjecting said animal tissue to a treatment with ethyl alcohol and a second step of preparing an aqueous extract of said tissue after separation of the ethyl alcohol from the tissue.

3. In a process for the recovery of a mixture of nucleotides containing predominantly adenosintriphosphate, from an animal tissue containing both protein and adenosintriphosphate, a first step of subjecting said animal tissue to a treatment with ethyl alcohol as a dehydrating and protein-insolubilizing agent, part of said treatment being carried out at the boiling temperature of ethyl alcohol, and a subsequent step of extracting the tissue with water.

4. A process for the preparation of a mixture of nucleotides containing predominantly adenosintriphosphate which comprises the step of subjecting the comminuted tissue to a treatment with a dehydrating agent adapted to insolubilize and precipitate protein, the step of separating said dehydrating agent from the insoluble residue and extracting said insoluble residue with water and purifying the extract formed by precipitation with mercuric acetate in the presence of acetic acid, subsequent treatment with hydrogen sulfide, dissolution of the product in alcohol and reprecipitation by calcium chloride.

5. Process for the preparation of adenosintriphosphate comprising immersing minced horse muscle in ethyl alcohol of 96%, allowing the mixture to stand, separating the alcohol from the muscle, suspending the muscle tissue in a further quantity of ethyl alcohol of 96%, bringing the mixture of muscle tissue and alcohol to boiling point, allowing the mixture to cool, separating the alcohol from the muscle tissue, and extracting the latter with water.

6. Process according to claim 5, in which the resulting aqueous extract is purified by precipitation with a solution of mercuric acetate acidified with acetic acid, treating the precipitate with hydrogen sulfide, dissolution of the product in alcohol and reprecipitation of calcium chloride from the alcoholic solution.

ALBERT EMERICH SZENT-GYÖRGYI.

REFERENCES CITED

The following references are of record in the file of this patent:

UNITED STATES PATENTS

| Number | Name | Date |
|---|---|---|
| 1,977,525 | Ostern | Oct. 16, 1934 |
| 2,379,912 | Laufer | July 10, 1945 |

FOREIGN PATENTS

| Number | Country | Date |
|---|---|---|
| 413,430 | Great Britain | July 19, 1934 |

OTHER REFERENCES

Rudy, Biochem. Z., vol. 267 (1933), pages 85–87.

Kerr, J. Biol. Chem., vol. 140 (1941), pages 77–80.

Rapoport et al., J. Biol. Chem., vol. 161 (1945), pages 421–422.